March 26, 1929.   E. S. BREUNIG ET AL   1,707,075
COMBINED TRACTOR AND FARM IMPLEMENT
Original Filed April 16, 1924   2 Sheets-Sheet 1
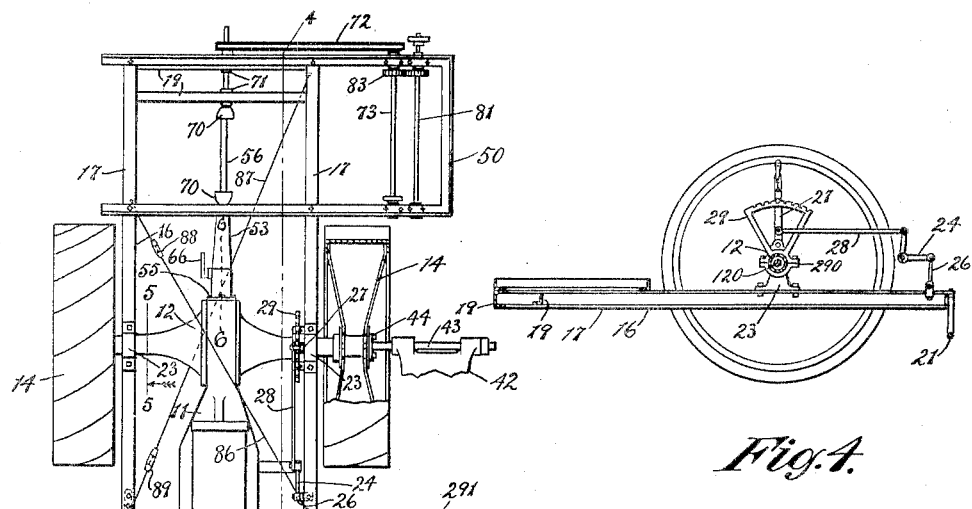
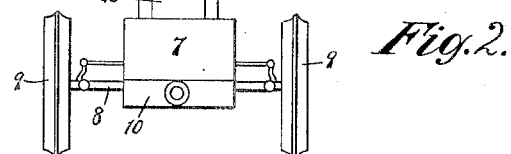
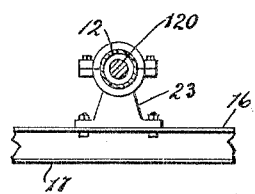
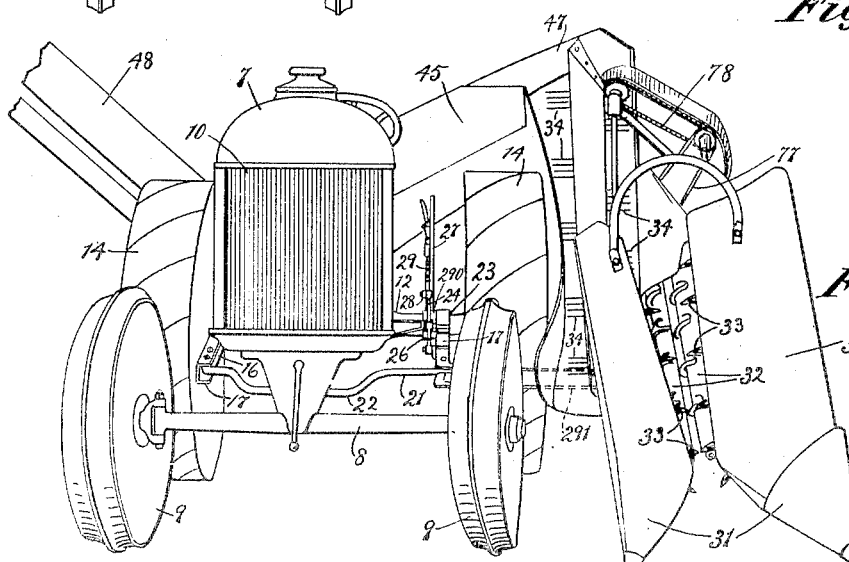

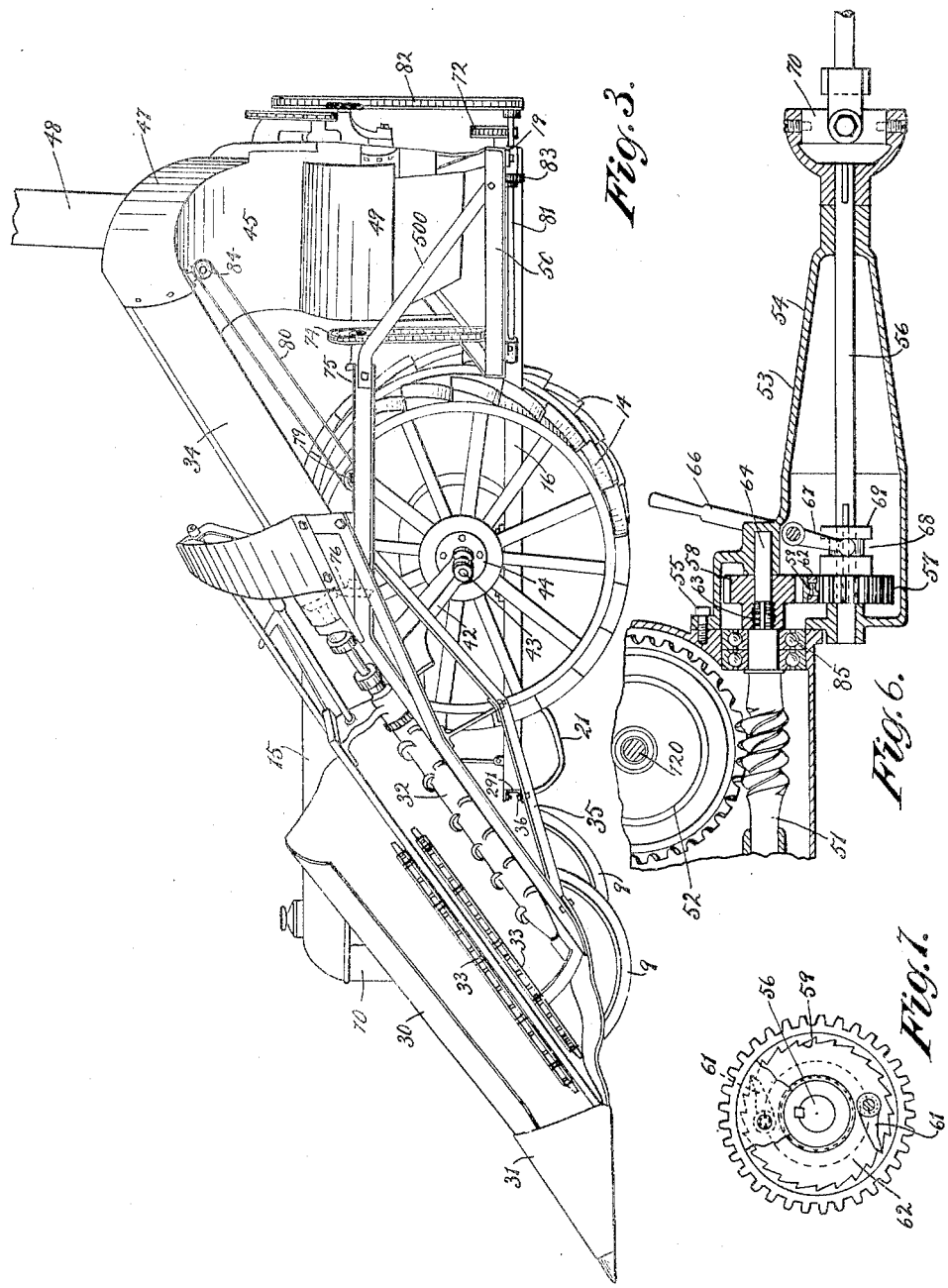

Patented Mar. 26, 1929.

1,707,075

UNITED STATES PATENT OFFICE.

EARL S. BREUNIG, LEROY J. BREUNIG, AND WILLIAM B. DOLDER, OF SOMONAUK, ILLINOIS.

COMBINED TRACTOR AND FARM IMPLEMENT.

Application filed April 16, 1924, Serial No. 706,807. Renewed February 9, 1928.

This invention relates to farm machinery, and one of the objects of the invention is the provision of a construction wherein a farm implement may be mounted on and carried by a tractor and operated by the power plant or power unit thereof.

Another object of the invention is the provision of a new and improved attaching mechanism for detachably mounting a farm implement on a tractor.

A further object of the invention is the provision of means for tiltably mounting a farm implement on a tractor and so arranging the parts that the tilting may be accomplished with ease and facility by the operator.

Still further objects of the invention are the provision of supporting means for farm implements that is in the form of an attachment that may be detachably connected to a tractor, and that is simple in construction, cheap to manufacture, easily assembled, efficient in operation and that is not likely to become broken or get out of order.

Other and further objects and advantages of the invention will appear from the following description taken in connection with the accompanying drawings, in which Fig. 1 is a perspective view of a tractor, showing a farm implement in position thereon;

Fig. 2 is a plan view of a farm tractor showing the implement support in position thereon;

Fig. 3 is a side elevation of the construction shown in Fig. 1;

Fig. 4 is a section on line 4—4 of Fig. 2;

Fig. 5 is a section on line 5—5 of Fig. 2, with parts removed to more clearly disclose the construction;

Fig. 6 is a vertical section of the driving attachment on an enlarged scale; and Fig. 7 is a detail of the power take-off device.

On the drawing the reference character 7 designates a farm tractor shown more or less diagrammatically, comprising the front axle 8, wheels 9 thereon, and radiator 10. The tractor is provided with the casing 11 on which is mounted the power unit, engine or power plant 15 provided with the usual clutch and changed speed mechanism. The rear end of the casing terminates in lateral extensions to form the axle housing 12 within which are journaled the axle shafts 120 on which are mounted the traction wheels 14, all of which are of the usual or well known construction.

Since the details of the construction of the tractor constitute no part of the present invention, the same are not illustrated and will not be further described, except for those parts that are necessary to an understanding of the construction of the present invention.

In farm work, where tractors are employed, it is desirable to provide means for detachably mounting the various farm implements on the tractor, whereby the same may be employed for carrying the different types of farm machinery, thereby eliminating the necessity of having separate trucks and driving mechanism for each implement. It is customary at the present time to provide each implement with supporting wheels and mechanism for operating the same from the wheels by drawing the implement along the ground. If the ground be soft or muddy the friction between the same and the wheels may not be sufficient to operate the device. It is therefore desirable not only to carry the implement on the tractor, but also to operate the same directly from the power plant thereof.

The attachment comprising the farm implement is adapted to be mounted on and carried solely by the tractor. Suitable means are provided for detachably pivotally connecting the attachment to the rear axle housing. In the form of the device selected to illustrate one embodiment of the invention, a suitable frame or support 16 is provided, on which the implement is mounted. The support is adapted to be detachably mounted on the tractor and is of suitable shape for supporting the implement with which it is associated, each implement being provided with a suitable frame for this purpose. On the drawings a corn picker has been selected to illustrate one embodiment of the invention. This type of implement is used by way of example only, and it is understood that the invention is not limited thereto.

The support 16 comprises a rectangular frame having the side members 17 and the rear end members 19. The forward ends of the side members 17 are suitably connected together by the bar 21 which is provided with an offset as at 22 to pass beneath the casing 11 of the tractor.

Suitable means are provided for pivotally mounting the frame on the rear axle housing 12. As shown, the side members 17 are each provided with a two-part bearing 23 which is adapted to be attached to the axle housing 12 at each side of the vehicle in such a manner as to permit the tilting of the frame 16.

Suitable means are provided for angularly adjusting the frame 16 about the housing 12. As shown more clearly in Figs. 2 and 4, a bell crank lever 24 is pivotally mounted on the casing 11 and has one arm connected to the frame 16 as by means of a link 26. The other arm of the bell crank 24 is connected to a lever 27 as by means of the link 28. The lower end of the lever is pivotally connected to a quadrant 29 which is rigidly mounted on the axle housing 12 as by means of a suitable clamp 290 as shown in Fig. 4. The lever is provided with the usual spring-pressed bolt for engaging the notches in the periphery of the quadrant for holding the lever 27 and consequently the frame 16, in adjusted position.

The frame 16 is provided at its forward end with a lateral extension 291 which is adapted to support the lower end of the gatherer mechanism 30. The corn picker or gatherer mechanism may be the conventional type comprising the gatherer boards 31, snapping rolls 32, the gatherer chains 33, and the elevator belt 34 mounted on the frame 35 and shown more or less diagrammatically in Fig. 1. The extension 291 is rigidly secured to the frame 35 in any suitable manner, as by bolts or clips 36.

The gatherer mechanism is supported at its rear end by means of a bracket 42 rigidly connected thereto and pivotally mounted on a stub shaft 43 carried by a plate 44 which is adapted to be attached to the hub of the drive wheel 14. In practice, the usual closure plate at the end of the hub is replaced by the plate 44. The shaft 43 extends outwardly in alinement with the rear axle whereby the frame 16 and corn gatherer mechanism 30 are free to pivot about the axis of the rear axle.

A suitable husker mechanism 45 is adapted to be mounted on the rear extension of the frame 16. The husker mechanism may be arranged in any suitable manner, but preferably it is arranged cross-wise of the tractor and at right angles to the gatherer mechanism. In the conventional construction, the husker mechanism is arranged parallel with the gatherer mechanism with the husk conveyor hood at the rear of the machine. The husker mechanism is adapted to be supported on a frame 50 secured to the rear end of the frame 16. The frame 50 is connected to the gatherer mechanism by suitable bracing means 500.

The gatherer mechanism is provided with an elevator or conveyor 34 on which the ears fall when separated from the stalks by the snapping rolls 32, as is usual in such constructions. In the present device the ears are delivered by the elevator 34 to a guideway or chute 47 which conveys the same to the husking rolls of the usual or of any well known construction. Since the details of the husking mechanism constitute no part of the present invention, it is not thought necessary to illustrate and further describe the same. After passing through the husking rolls the ears of corn are delivered through the elevator 48 to a wagon or other receptacle in the usual manner, the husks passing through the husk conveyor hood 49 to the ground as is usual in such constructions.

Means are provided for operating the gatherer and husker mechanisms directly from the power unit or power plant of the tractor. Any suitable mechanism may be employed for this purpose. As shown, the power is taken from the power shaft 51 that drives the differential cage 52 of the rear axle. The power take-off device 53 comprises a casing 54 which is adapted to be detachably attached to the differential housing of the casing 11 as by means of the cap screws 55. Journaled in the casing 54 is a countershaft 56 which is operated from the power shaft 51 through the gears 57 and 58. The gear 57 is provided with means whereby when the power shaft 51 is rotated in the opposite direction the rotation of the shaft 56 will not be reversed. As shown, the gear 57 is rotatably mounted on a hub 62 splined on the shaft 56 and is provided with an internal ratchet 59 the teeth of which are adapted to be engaged by the pawls 61 carried by said hub.

The gear 58 is adapted to be attached to the power shaft 51 in any suitable manner, as by being provided with an internally threaded hub which is adapted to be secured to the outer end 63 of the power shaft 51 and is, preferably, also splined thereon to prevent its accidental removal when the shaft 51 is reversed. A stub-shaft 64 may be secured in the gear 58 and its outer end is adapted to be journaled in the housing or casing 54.

In applying the power take-off device 53 to the tractor the gear 58 is secured onto the end 63 of the shaft 51 after which the casing 54 is applied to the differential housing with the forward end of the stub-shaft 64 engaging in the bearing in said casing.

The gear 57 may be disengaged from the gear 58 by means of the lever 66 the lower end of which is provided with a yoke 67 which engages in a groove 68 in a collar 69 secured to the hub 62.

The outer or rear end of the shaft 56 is journaled in bearings 71 carried by the rear end members 19 as shown in Fig. 2. The intermediate portion of the shaft is provided with a plurality of universal joints 70 whereby the frame 16 may be tilted relatively to the casing 54. The shaft 56 may be longitudinally movable in the bearings 71 to permit of such tilting.

The gathering mechanism 30 is operated from the countershaft 56 through the chain drive 72, shaft 73, chain drive 74, shaft 75, bevel gears 76 and associated shafts and sprockets. The gatherer chains are operated from the gatherer rolls through the chain or belt drive 77 and 78 in the usual manner. The elevator is operated from shaft 75 through two sets of suitable bevel gears 79 and 84 and belt drive 80.

The husker mechanism, elevator, etc. are operated from the countershaft 81 through the chain or flexible drive 82. The shaft 81 is operated from the shaft 73 through the gears 83 as clearly shown in Fig. 2 of the drawings.

It is evidently immaterial what type of mechanism is employed for operating the gatherer and husking mechanisms so long as they are operated from the shaft 56.

It will thus be apparent that by driving the picker and husker mechanism from that portion of the power shaft that drives the differential cage the said mechanisms will always run at normal axle speeds and operating the engine in low speed gear will effect a corresponding reduction in the speed of the husker and picker mechanisms. In other words, the change of speed of the picker and husker mechanism will not be proportional to the change of speed in the crank shaft.

The frame 16 may be provided with suitable brace or tension members for rendering said frame substantially rigid. As shown, brace or tension members 86 and 87 arranged diagonally across the frame 16 are employed for this purpose. The member 86 may if desired extend above the differential housing whereby the same will assist in supporting the farm implement mounted on said frame 16. The members 86 and 87 may be and preferably are provided with turnbuckles 88 and 89 for tightening said brace members to the required degree of tautness to render said frame 16 sufficiently rigid to prevent unnecessary twisting of the same during the travel of the tractor over rough or uneven ground.

In order to remove the implement from the tractor and place the latter in its original condition, it is only necessary to remove the housing 54 from the differential casing, release the turnbuckle 88, remove the bearings 23 from the axle housings, the shaft 43 from the wheel 14 and the clamp 290 from the axle housing 12, and then replace the nut on the end of the shaft 51, and the caps on the differential housing and on the hub of the rear wheel.

It is thought from the foregoing taken in connection with the accompanying drawings that the construction and operation of our device will be apparent to those skilled in the art, and that various changes in size, shape, proportion and details of construction may be made without departing from the spirit and scope of the appended claims.

We claim as our invention:

1. An attachment for a tractor comprising a frame, means for pivotally connecting said frame to the rear axle of a tractor, a stub axle, corn picker mechanism, means for mounting said mechanism on said frame and stub axle, means for detachably connecting said stub axle to the hub of one of the drive wheels of said tractor, husker mechanism mounted on the rear end of said frame and carried solely thereby, and driving means for said mechanisms.

2. In combination, a tractor, a frame pivotally mounted on the rear axle of said tractor and extending across the rear and to one side thereof, a farm implement mounted on said frame at the rear and on one side of said tractor, said frame and implement being supported solely by said tractor.

3. In combination, a tractor, a supporting frame pivotally mounted on the rear axle of said tractor and extending rearwardly and forwardly therefrom and supported solely thereby, a forward and a rear lateral extension carried by said frame, an auxiliary support extending outwardly from said wheel in axial alinement with said axle, a corn picker mounted on the forward extension and said auxiliary support, a corn husker mounted on said frame and said rear lateral extension, and means for operating said picker and husker from the power unit of said tractor.

4. In combination, a tractor including a power unit for propelling said tractor, a frame pivotally mounted on the rear axle of said tractor and carried solely thereby, lateral extensions on said frame, an auxiliary support, a corn picker mounted on one of said extensions and said auxiliary support, a corn husker mounted on said frame and on another of said extensions, means for operating said picker and husker from said power unit, and means for adjustably tilting said frame.

5. In combination, a tractor, a frame, means for detachably pivotally mounting said frame on the rear axle of said tractor, a corn picker mounted on said frame and extending longitudinally of said tractor at the side thereof, and a corn husker mounted on the rear end of said frame and extending transversely of said tractor at the rear thereof.

6. In combination, a tractor, including a power unit and a power shaft, a corn picker, a corn husker, means for adjustably supporting said picker alongside said tractor and said husker at the rear of said tractor and extending transversely thereof, a conveyor for automatically delivering corn from said picker to said husker as the same is gathered by said picker, and means for operating said picker and husker from the power unit of said tractor, said means receiving power from said power shaft adjacent to but independently of the rear axle shafts.

7. An attachment for supporting a farm implement on a tractor, comprising a main frame adapted to extend longitudinally of said tractor, and an auxiliary frame rigidly secured to said main frame and extending laterally therefrom, means for pivotally connecting said main frame to the rear axle housing of said tractor for supporting the same solely from said tractor, and means for vertically adjusting the forward end of said frame.

8. In combination, a tractor comprising a power unit and a power shaft operated thereby, said shaft extending longitudinally of said tractor, an implement supporting frame pivotally and detachably mounted on and carried solely by said tractor, corn picker mechanism carried by said frame and means for operating said mechanism from the rearmost portion of said power shaft, said means extending rearwardly from said tractor.

9. In combination, a tractor including a power unit, a differential cage and a power shaft for operating said cage, a frame pivotally mounted on said tractor and carried solely thereby, a farm implement mounted on said frame at the side and across the rear of said tractor, a power take-off device operated from said power shaft at a constant speed ratio relatively to said cage, mechanism on said frame for operating said implement, and means for driving said mechanism from said power take-off device.

10. In combination, a tractor comprising a rear axle and a housing therefor, an implement supporting frame pivotally connected to said housing, tension members connected to and extending across said frame, one of said members extending over said housing for assisting in supporting said frame, and means for tensioning said members.

11. In combination, a tractor comprising a differential cage, a power unit and means for driving said cage from said unit, a frame pivotally and detachably mounted on and supported solely by said tractor, a corn picker carried by said frame alongside said tractor, a corn husker mounted on said frame transversely thereof at the rear of said tractor, and means for operating said picker and husker at a constant speed ratio relative to said cage.

12. In combination, a tractor comprising a power unit, a rear axle housing, a differential cage within said housing, a worm gear shaft for driving said cage, a frame, means for pivotally connecting said frame to said housing at each side of said cage, means for adjustably rocking said frame on said housing, a corn picker and a corn husker mounted on said frame, and means operated by said worm gear shaft for operating said picker and husker.

13. In combination, a tractor comprising a pair of traction wheels, a power unit, an axle housing, a differential cage within said housing, a power shaft for operating said cage from said unit, a frame, means pivotally engaging said housing at each side of said cage for mounting said frame on said housing, mechanism including a lever for tilting said frame on said housing, a lateral extension on the forward end of said frame, a corn picker mounted on said extension at the side of said tractor, a stub axle journaled on said picker, means for detachably connecting said axle to the hub of one of said wheels, a corn husker on said frame and carried solely thereby, and means for operating said picker and husker from said power shaft at a constant speed ratio relative to said cage.

14. An attachment for tractors comprising a frame, a stub axle, means for detachably pivoting said frame to said tractor, means for detachably attaching said stub axle to the hub of one of the drive wheels of said tractor, corn husker mechanism mounted on the rear end of said frame, a corn picker mounted on said frame and said stub axle, and lever mechanism secured to said frame and adapted to be attached to said tractor for raising and lowering the front end of said frame.

15. An attachment for a four wheel tractor comprising a rigid frame, a lateral extension on said frame, corn picker mechanism secured to said extension, corn husker mechanism mounted on said frame, and means for detachably pivotally connecting said frame and mechanisms to said tractor with said picker alongside said tractor.

16. In an apparatus of the character described, the combination, with a conventional tractor including its main axle mechanism, a power unit, and tractor wheels, of a structure including a frame, corn picker mechanism and husker mechanism capable of being assembled as a unit, together with means for pivoting and wholly supporting said unitary structure on said axle mechanism with supports on each side of the middle thereof whereby the same may be tilted on the axis of said axle, with a picker mechanism located at one side of said tractor and husker mechanism at the rear thereof, means for holding the said unitary structure at different degrees of inclination about said axis, and flexible driving connection between said mechanism and said power unit.

17. In an apparatus of the character described, the combination, with a conventional tractor including its axle housing and a driven shaft projecting therein midway its length and at right angles thereto, of a stub axle projecting from one of the wheels of said tractor in axial alignment with the axis of said wheel, a structure including a frame, corn picker mechanism and husker mechanism capable of being assembled as a unit, together with means for pivotally supporting said structure at each side of the middle of said axle housing and on said stub axle whereby the same may be tilted on the axis of said axle, and driving devices for said mechanisms extending from said driven shaft at the rear of said axle housing including flexible connections to compensate for the tilting of said unitary structure.

18. In combination with a conventional tractor having a stationary rear axle housing with tractor wheels at each end thereof, an attachment for said tractor comprising corn harvester mechanism mounted on and carried solely by said tractor, means for detachably, pivotally connecting said attachment to said rear axle housing between said wheels for supporting the rear portion of said attachment, and means connected to said structure for adjustably tilting the same relative to said housing.

19. In an apparatus of the character described, the combination with a conventional tractor including a stationary rear axle housing, of a structure including a frame, corn harvesting mechanism mounted thereon, means for wholly supporting said frame and mechanism on said tractor including pivotal connections between said frame and housing with supports on each side of the center of said housing whereby the structure may be tilted, and manually operated means for holding said structure at different degrees of inclination.

20. In an apparatus of the character described, the combination with a conventional tractor including a stationary differential housing, of a structure including a frame having side members and corn harvesting mechanism mounted upon said frame, means for pivotally connecting the side members of said frame to said housing at points between the length of said frame on each side of the center of said housing whereby said frame may be tilted, said mechanism being mounted on said frame both forwardly and rearwardly of said pivotal points, and manually operated means for holding said structure at different degrees of inclination.

21. A corn harvester attachment for a conventional tractor having a stationary rear axle housing, comprising a structure including corn harvester mechanism adapted to be mounted on and carried solely by said tractor, means for detachably pivotally connecting said structure to said stationary housing at each side of the center portion thereof, and manually operated means for raising and lowering the front of said structure for tilting the same about said first named means when said structure is attached to said tractor.

22. In an apparatus of the character described, the combination with a conventional tractor including a stationary differential housing, of a structure including a frame having side members, means for pivotally connecting said side members to said housing, one on each side of the center of said housing, gathering and picking mechanism carried by said frame forwardly of said pivotal connections, husking mechanism carried by said frame rearwardly of said pivotal connections, and manually operated means for tilting said frame about said pivotal connections and holding the same at different degrees of inclination.

23. In an apparatus of the character described, the combination with a conventional tractor including a stationary differential housing, a power unit and tractor wheels, of a structure including a frame, corn gathering and picking mechanism and husking mechanism, said frame having side members, means for wholly supporting said frame and mechanism on said tractor, said means including pivotal connections between said side members and housing, with a side member on each side of the center of said housing, with the gathering and picking mechanism mounted on said frame forwardly of said pivotal connections and the husking mechanism mounted on said frame at the rear of said pivotal connections, manually operated means between said frame and tractor for holding said structure at different degrees of inclination, and flexible driving connections between said mechanism and said power unit.

EARL S. BREUNIG.
LEROY J. BREUNIG.
WILLIAM B. DOLDER.